(12) United States Patent
Zeidman

(10) Patent No.: US 8,316,390 B2
(45) Date of Patent: Nov. 20, 2012

(54) METHOD FOR ADVERTISERS TO SPONSOR BROADCASTS WITHOUT COMMERCIALS

(76) Inventor: Robert M. Zeidman, Cupertino, CA (US)

( * ) Notice: Subject to any disclaimer, the term of this patent is extended or adjusted under 35 U.S.C. 154(b) by 2354 days.

(21) Appl. No.: 09/767,819

(22) Filed: Jan. 22, 2001

(65) Prior Publication Data

US 2002/0100055 A1  Jul. 25, 2002

(51) Int. Cl.
*H04N 60/32* (2006.01)
*H04N 7/16* (2011.01)

(52) U.S. Cl. .............................. 725/23; 725/14; 725/20

(58) Field of Classification Search ............ 725/60, 725/22, 109, 110, 112, 8, 20, 23, 14, 9, 12, 725/105; 705/14, 26, 27, 14.1; 4/20
See application file for complete search history.

(56) References Cited

U.S. PATENT DOCUMENTS

| | | | |
|---|---|---|---|
| 5,488,423 A | 1/1996 | Walkingshaw et al. | 348/460 |
| 5,801,747 A | 9/1998 | Bedard | 348/1 |
| 5,872,588 A * | 2/1999 | Aras et al. | 725/14 |
| 5,915,243 A * | 6/1999 | Smolen | 725/23 |
| 5,982,445 A | 11/1999 | Eyer et al. | 348/461 |
| 6,002,394 A | 12/1999 | Schein et al. | 345/327 |
| 6,058,430 A | 5/2000 | Kaplan | 709/245 |
| 6,073,171 A | 6/2000 | Gaughan et al. | 709/219 |
| 6,075,971 A * | 6/2000 | Williams et al. | 725/23 |
| 6,097,383 A | 8/2000 | Gaughan et al. | 345/327 |
| 6,098,106 A * | 8/2000 | Philyaw et al. | 709/238 |
| 6,144,402 A | 11/2000 | Norsworthy et al. | 348/13 |
| 6,647,548 B1 * | 11/2003 | Lu et al. | 725/20 |
| 6,766,524 B1 * | 7/2004 | Matheny et al. | 725/23 |
| 7,051,351 B2 * | 5/2006 | Goldman et al. | 725/34 |
| 7,103,904 B1 * | 9/2006 | Blackketter et al. | 725/32 |

OTHER PUBLICATIONS

"Lawmaker Criticizes 'Schindler's List' Airing Wendnesday, Feb. 26, 1997",[online] [retrieved on Dec. 7, 2006] Retrived from the Internet <URL: http://www.writing.upenn.edu/~afilreis/Holocaust/schindler-on-tv.html>.*
Berney, Kerri, "You Should Know Better, Mr, Spielberg", Feb. 25, 1997, [online] [retrieved on Dec. 7, 2006] Retrived from the Internet <URL: http://members.aol.com/harx1/schlind.html>.*

* cited by examiner

*Primary Examiner* — John Schnurr
(74) *Attorney, Agent, or Firm* — Jim H. Salter (57) ABSTRACT

A system and method that allows content to be broadcast without commercial interruption, yet lets the company or companies that sponsor the broadcast to offer advertisements and discounts and various special offers to the viewers at a later time. The amount of time a viewer spends watching a particular broadcast is recorded along with information about the sponsoring companies or organizations for the broadcast. The viewer later accesses a central database, which sends back to the viewer advertisements, coupons, discounts, contests, and other enticements to purchase products, based on the amount of time the viewer spent watching broadcasts or segments of broadcasts that were sponsored by the advertiser.

10 Claims, 6 Drawing Sheets

METHOD FOR ADVERTISERS TO SPONSOR BROADCASTS WITHOUT COMMERCIALS

BACKGROUND OF THE INVENTION

Television shows on network stations are broadcast to viewers throughout the world at very little cost to the viewer. The production and transmission costs of these broadcasts are typically supported by corporations that interrupt the broadcasts at regular intervals with advertisement, called commercials. As production costs increase, network television shows have less and less content while the viewing time is taken up by commercials. These commercials break up the shows, making the viewing experience less enjoyable and informative. These interruptions have not allowed television viewing to reach its potential and have created much competition from pay-per-view stations, video and DVD rental stores, and movie theaters. If it were not for these commercial interruptions, television viewing would be much greater. If television viewing could be increased while still allowing corporations to sponsor content, network broadcasters would be much happier and would be able to compete better against other forms of entertainment and education. If corporations could still attract customers by sponsoring shows, they would have no objection to eliminating commercials, especially if it resulted in more television viewers and more customers.

Other means of broadcasting content are now becoming available on the Internet. Methods are being studied and tested for sponsoring these broadcasts. A method that allows companies to sponsor broadcasts while avoiding commercial interruptions is ideal for the broadcaster and for the viewer. As long as a sponsoring corporation is still able to turn viewers into customers, the corporation will be amenable to the new method, especially if it results in more customers than a standard broadcast that is interrupted by commercials.

SUMMARY OF THE INVENTION

The present invention allows content to be broadcast without commercial interruption, yet lets the company or companies that sponsor the broadcast to offer advertisements and discounts and various special offers to the viewers at a later time of their own choosing. In this application, the terms "broadcast" encompasses all forms of transmitting media content over a WAN to an end user, including radio wave broadcasts such as network television and network radio broadcasts, cable broadcasts such as cable television, and streaming media broadcasts such as video and audio over an Internet connection that may be via telephone lines, television cables, radio waves, etc.

The invention provides a method and apparatus for recording the amount of time spent watching a particular broadcast. The invention also provides a method and apparatus for recording the sponsoring companies or organizations for each broadcast. The invention provides a method and apparatus for the viewer to access a central database at any time, which provides advertisements, coupons, discounts, contests, and other enticements to purchase products, based on the amount of time the viewer spent watching broadcasts that were sponsored by the advertiser.

In one embodiment, the user watches an Internet connected television. At various regular intervals, such as the vertical blanking interval of the television signal, HTTP protocol communications from a Web server are sent to the television, which places a cookie or updates an existing cookie on the television hard drive. This cookie contains information including the time of day, the television channel, the name of the television show, and each sponsor of the show. At a later time, of the viewer's choosing, the viewer can use the Internet connected television to connect to a website. This website can belong to the television network or a particular sponsor or a central clearing house for coupons. When connecting to the website, using the standard HTTP protocol, the website examines the cookie and retrieves the information in it. Each sponsor can then offer advertisements, coupons, discounts, and other enticements to purchase goods based on the amount of time the viewer spent watching a sponsored broadcast.

In a second embodiment, the user watches an Internet connected television. At various regular intervals, such as the vertical blanking interval of the television signal, data is sent to a centralized database for the network or the sponsor or a clearinghouse for coupons. The data contain information including the time of day, the television channel, the name of the television show, and each sponsor of the show. The data also contain a user identifier such as a name, user ID, or television serial number. At a later time, of the viewer's choosing, the viewer can use the Internet connected television to connect to a website that has access to the central database. This website can belong to the television network or a particular sponsor or a central clearing house for coupons. When connecting to the website, using the standard HTTP protocol, the user identifier is sent to the website which then examines the central database and retrieves the information in it for this particular user. Each sponsor can then offer advertisements, coupons, discounts, and other enticements to purchase goods based on the amount of time the viewer spent watching a sponsored broadcast.

In a third embodiment, the user watches a streaming media broadcast from a Web server using a computer with an Internet connection. At various regular intervals during the broadcast, HTTP protocol communications from a Web server are sent to the computer, which places a cookie or updates and existing cookie on the computer hard drive. This cookie contains information including the time of day, the website that is the course of the broadcast, the name of the broadcast content, and each sponsor of the broadcast. At a later time, of the viewer's choosing, the viewer can use the computer to connect to a website. This website can belong to the television network or a particular sponsor or a central clearing house for coupons. When connecting to the website, using the standard HTTP protocol, the website examines the cookie and retrieves the information in it. Each sponsor can then offer advertisements, coupons, discounts, and other enticements to purchase goods based on the amount of time the viewer spent watching a sponsored broadcast.

In a fourth embodiment, the user watches a streaming media broadcast from a Web server using a computer with an Internet connection. At various regular intervals during the broadcast, data is sent to a centralized database for the network or the sponsor or a clearinghouse for coupons. The data contain information including the time of day, the website that is the course of the broadcast, the name of the broadcast content, and each sponsor of the show. The data also contain a user identifier such as a name, user ID, or computer serial number. At a later time, of the viewer's choosing, the viewer can use the computer to connect to a website that has access to the central database. This website can belong to the television network or a particular sponsor or a central clearing house for coupons. When connecting to the website, using the standard HTTP protocol, the user identifier is sent to the website which then examines the central database and retrieves the information in it for this particular user. Each sponsor can then offer advertisements, coupons, discounts, and other enticements to purchase goods based on the amount of time the viewer spent watching a sponsored broadcast.

DETAILED DESCRIPTION

Figure 1:
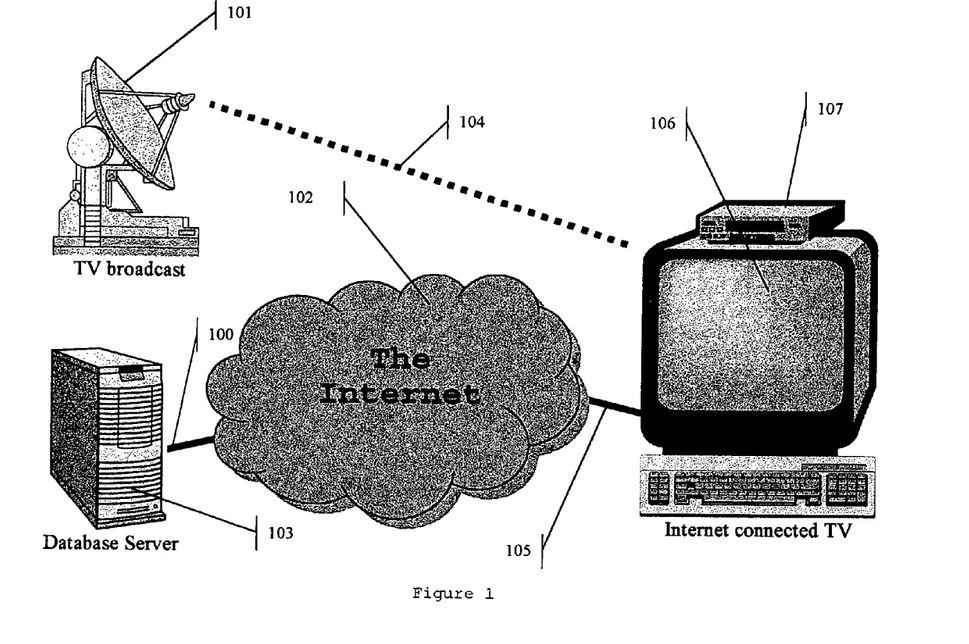
FIG. 1 shows an Internet-enabled television 106, a network TV broadcast transmitter 101, a database server 103, and the Internet 102, in accordance with the present invention.
Figure 2:
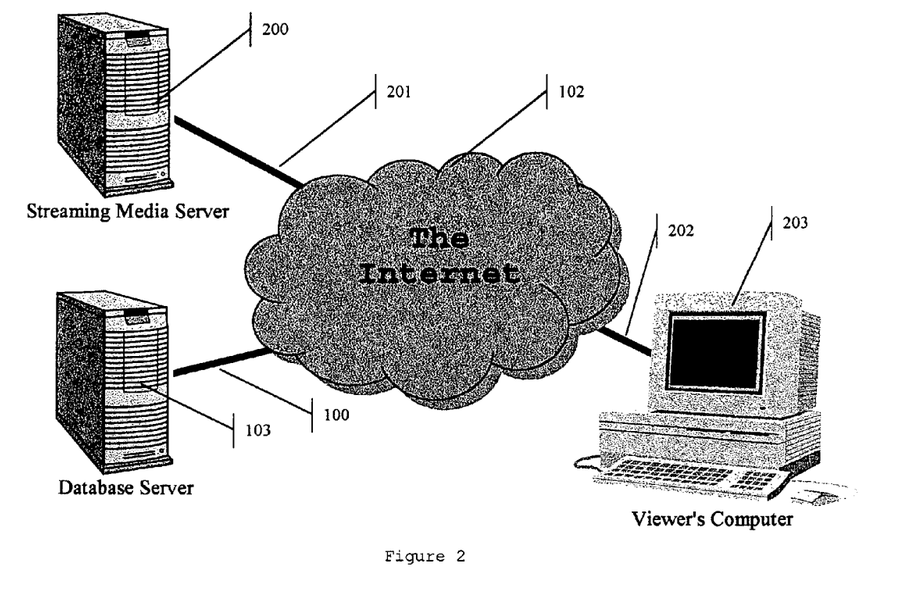
FIG. 2 shows a computer 203, a streaming media server 200, a database server 103, and the Internet 102, in accordance with the present invention.

The present invention is illustrated in FIG. 1 and FIG. 2. FIG. 1 shows one configuration where an Internet-enabled television 106 with a hard disk 107 receives broadcasts 104 from a network television station via transmitter 101. The Internet-enabled TV 106 is also connected for two-way communication to a database server 103 via the Internet 102. In this embodiment, the computer is connected to the Internet via telephone lines 105 using a modem. In this embodiment, the database server is connected to the Internet via a T-1 connection 100.

The television 106 receives one-way transmissions 104 from the network broadcast transmitter 101. Embedded in the transmission are HTTP protocol messages containing information about the show being broadcast, the sponsors of the show, and the current time. Other information can also be embedded and sent to the television 106 for other purposes. The embedded information is stored on the hard disk 107 in the form of a cookie. At a later time, the television 106 connects to the database server 103 which is part of a website on the Internet 102. The database server 103 queries the cookie on the television 106 in order to determine which shows were watched, during which times, and which advertisers sponsored those shows or those segments of shows. Based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the television 106.

In another embodiment, the television 106 receives one-way transmissions 104 from the network broadcast transmitter 101. Embedded in the transmission are HTTP protocol messages containing information about the show being broadcast, the sponsors of the show, and the current time. Other information can also be embedded and sent to the television 106 for other purposes. The embedded information is stored on the hard disk 107. During the broadcast or at a later time, the television 106 connects to the database server 103 which is part of a website on the Internet 102. The television 106 sends the information on the hard disk 107 to the database server 103 via the Internet 102. The database server 103 stores the information in its database. At a later time, based on which advertiser sponsored the show or show segments and the amount of time spent watching the show or show segments, the database server searches the database for coupons, advertisements, discounts, and other enticements to buy products or services from the advertiser, and delivers these enticements via the Internet 102 to the television 106.

FIG. 2 shows another configuration where a computer 203 receives streaming media broadcasts from a streaming media server 200 via the Internet 102. The computer 203 is also connected for two-way communication to a database server 103 via the Internet 102. In this embodiment, the computer is connected to the Internet via telephone lines 202 using a modem. In this embodiment, the database server is connected to the Internet via a T-1 connection 100. In this embodiment, the streaming media server is connected to the Internet via a T-1 connection 201.

The computer 203 receives transmissions from the streaming media server 200 via the Internet 102. Embedded in the transmission are messages containing information about the show being broadcast, the sponsors of the show, and the current time. Other information can also be embedded and sent to the computer 203 for other purposes. The embedded information is stored on the computer's hard disk in the form of a cookie. At a later time, the computer 203 connects to the database server 103 which is part of a website on the Internet 102. The database server 103 queries the cookie on the computer 203 in order to determine which shows were watched, during which times, and which advertisers sponsored those shows or those segments of shows. Based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the computer 203.

In another embodiment, the computer 203 receives transmissions from the streaming media server 200 via the Internet 102. Embedded in the transmission are messages containing information about the show being broadcast, the sponsors of the show, and the current time. Other information can also be embedded and sent to the computer 203 for other purposes. The embedded information is stored on the computer's hard disk. During the broadcast or at a later time, the computer 203 connects to the database server 103 which is part of a website on the Internet 102. The computer 203 transmits the information on its hard disk to the database server 103 via the Internet 102. The database server 103 stores the information in the database. At a later time, based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the computer 203.

Figure 3:
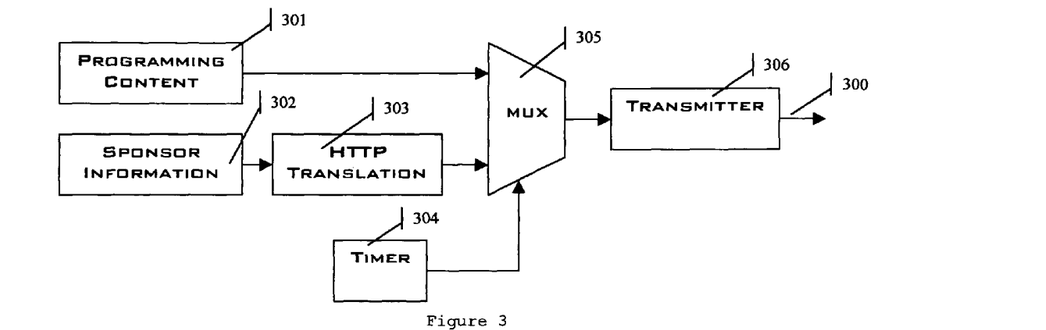
FIG. 3 shows a mechanism for combining broadcast information with broadcast content during a broadcast transmission.

FIG. 3 shows an embodiment in which content with imbedded information is created from normal broadcast content. The method shown can be implemented in hardware or software or combinations of hardware and software. Sponsor information 302 is translated into a format such as HTTP protocol using HTTP translator 303. It is then combined with the programming content 301, such as a television show or streaming video, through multiplexer 305. The multiplexer inserts the sponsor information at regular periods, or frames, throughout the broadcast by using timer 304. A frame may be a single television picture scan, or it may be a single frame of streaming video data or it may be an arbitrary amount of data. The sponsor information can be inserted into the data stream at a time or in such a way that it does not destroy data, such as during the vertical blanking time of a television frame scan. The data is then put into the transmitter 306, which is then transmitted as analog or digital data 300.

Figure 4:
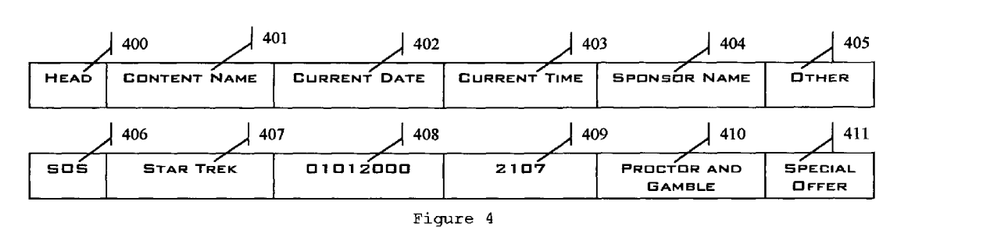
FIG. 4 shows a general format and a specific format for encoding embedded information in a stream of data.

FIG. 4 shows an embodiment of a general format and a specific format for the embedded sponsor information as a stream of data. A packet is inserted before a frame of content data, which includes the head 400, content name 401, the current date 402, the current time 403, the sponsor name 404, and other data 405 as required. The head can be a start-of-slice (SOS) flag or an end-of-slice (EOS) flag, which signal the start or end of a time slice respectively. An example of specific information is shown where the head is start-of-slice 406, content name is "Star Trek" 407, the date is "Jan. 1, 2000" 408, the time is "9:07 PM" 409, the sponsor is "Proctor and Gamble" 410, and a special offer 411 is included for the viewer at this time.

Figure 5:
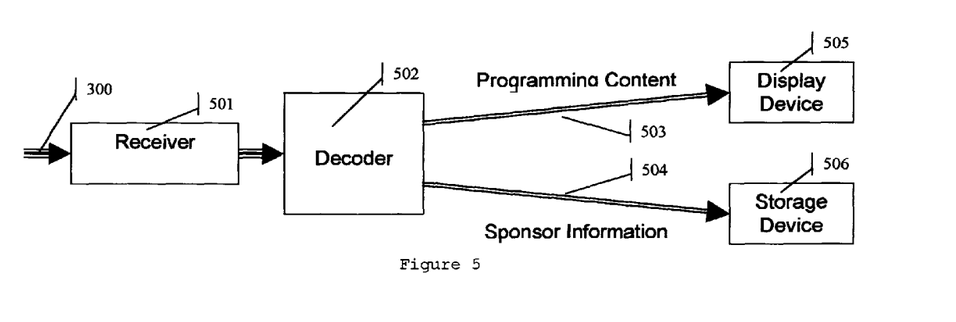
FIG. 5 shows a mechanism for separating broadcast information and broadcast content from a broadcast transmission.

FIG. 5 shows an embodiment in which the sponsor information is separated from the broadcast content using hardware or software or a combination of hardware and software. The software portion of the implementation may be a stand-alone media player software or a plug-in to a Web browser. The broadcast stream 300, which may be a television picture or a streaming video is received by a receiver 501 that converts the signal to one that is usable by the decoder 502 that splits the information into programming content 503 and sponsor information 504. The programming content 503 is sent to a display device 505 such as a computer monitor or television screen. The sponsor information 504 is recorded on a storage device 506 such as a hard disk.

Figure 6:
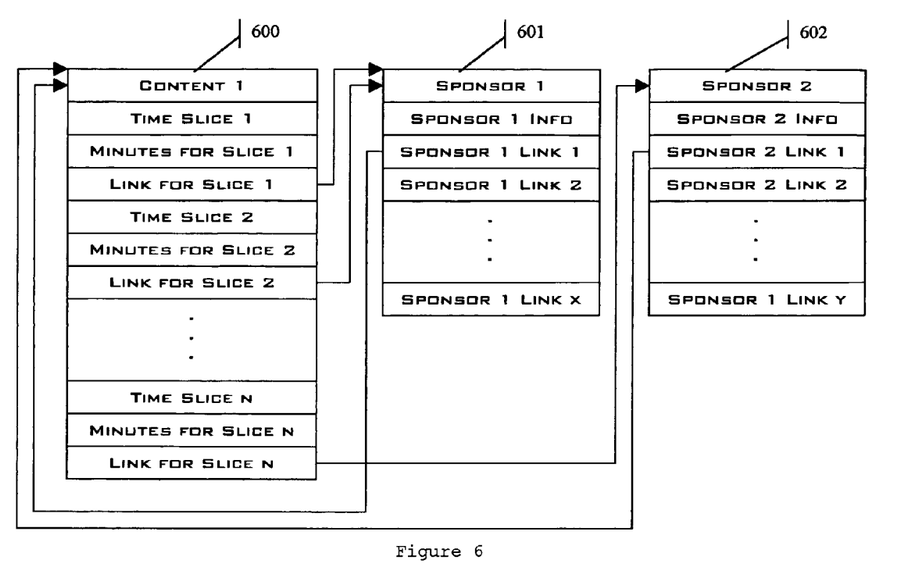
FIG. 6 shows a format for storing the embedded information on the client storage device 506 in a database.

FIG. 6 shows one embodiment of the format for storing the embedded information on the client storage device 506 in a database. For each television show or video clip there is an entry block 600 containing several records. The first record contains the name of the content. There are sections for each time slice of the content broadcast. These time slices may, for example, be 15-minute intervals so that there are 4 slices in a one-hour broadcast. Sponsors may then sponsor 1 to 4 slices of a one-hour broadcast. Associated with each time slice in the database are 3 records. One record contains the name of the time slice. Another record contains the number of minutes during that time slice that the viewer was actually watching the broadcast. Another record contains a link to a sponsor block in the database for the sponsor of that time slice. There may be multiple records for links to multiple sponsors of a broadcast time slice.

A sponsor block, such as 601 or 602, contains multiple records. One record contains the name of the sponsor. Another record contains information about the sponsor. Other records contain links to content that is sponsored by the sponsor. Having both content blocks and sponsor blocks in the database, with links to each other, allows the database to easily be searched for all content sponsored by a specific sponsor, or all sponsors of particular content.

Figure 7:
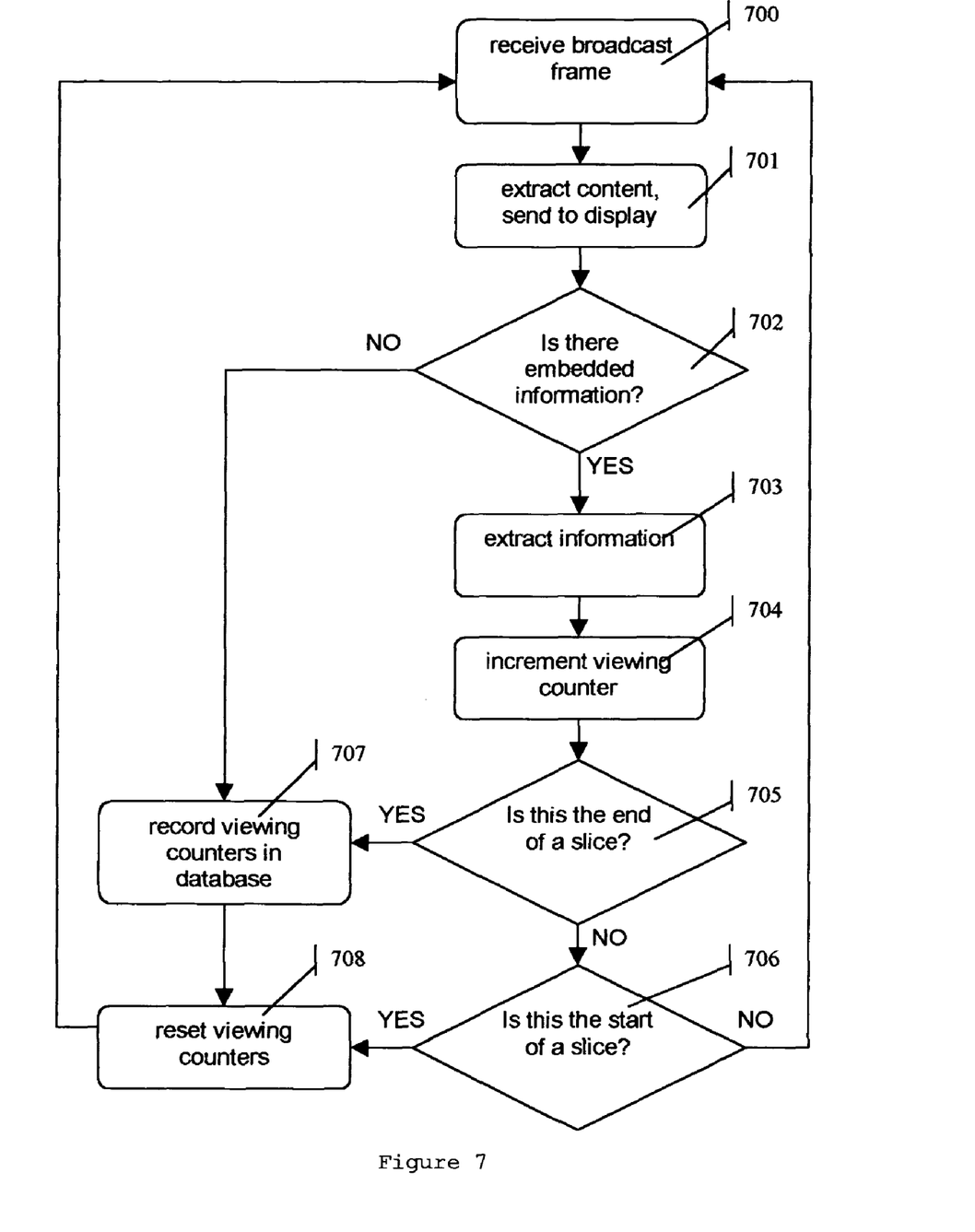
FIG. 7 shows an algorithm within the decoder 502 that strips out embedded information and creates the database records 600, 601, 602

FIG. 7 shows an embodiment of the algorithm within the decoder 502 that strips out embedded information and creates the database records 600, 601, 602. This algorithm may be implemented in software or hardware or a combination of software and hardware. Execution starts at block 700 where a frame of broadcast content is received. The content information is separated out and sent to the display device by executing block 701. Execution of block 702 searches for embedded sponsor information in the broadcast. If there is no embedded sponsor information, execution is transferred to block 707. This may be due to the fact that the viewer has switched between a commercial-free broadcast to some other content such as a normal commercial broadcast. If there is embedded sponsor information, block 703 is executed, extracting that information. Block 704 is then executed where viewing counters are incremented. These viewing counters keep track of how much time the viewer has spent viewing the content. In block 705, the embedded information is examined for an end-of-slice marker that signals the end of a time slice. If this marker is found, execution is transferred to block 707. Otherwise, execution is transferred to block 706 where the embedded information is examined for a start-of-slice marker that signals the start of a time slice. If this marker is found, execution is transferred to block 708. Otherwise execution is transferred back to block 700 and the process is repeated.

Block 707 is executed when a time slice has ended or the viewer has switched to another type of broadcast. When this block is executed, the viewing counters are recorded in the database on the client machine. Execution is then transferred to block 708.

Block 708 is executed at the start of a new time slice. This block resets the viewing counters and transfers execution to block 700, starting the entire process over.

Figure 8:
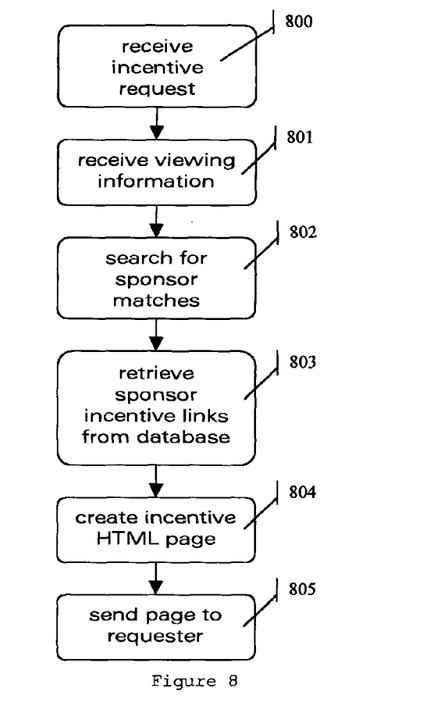
FIG. 8 shows an algorithm within the database server 103 that gives incentives back to the viewer.

FIG. 8 shows an embodiment of the algorithm within the database server 103 that gives incentives back to the viewer. Execution starts in block 800 when a request for an incentive is received from the viewer. Execution continues to block 801 where, through a handshaking protocol, the information in the client database stored in storage device 506 on the viewer's computer 203 or Internet connected TV 106 is used to query the database of database server 103. Execution continues to block 802 where the database server searches its database for matches with the sponsors reported by the viewer. Execution continues to block 803 where links to sponsor Web pages are retrieved from the database server based on the information from the viewer. Execution continues to block 804 where an entire HTML page is created which contains links to all incentives to which the viewer is entitled, based on the amount of time he spent viewing specific content. Execution continues to block 805 where this Web page is then sent back to the viewer. At this time, the viewer can click on links to obtain coupons, discounts, special offers, etc.

Figure 9:
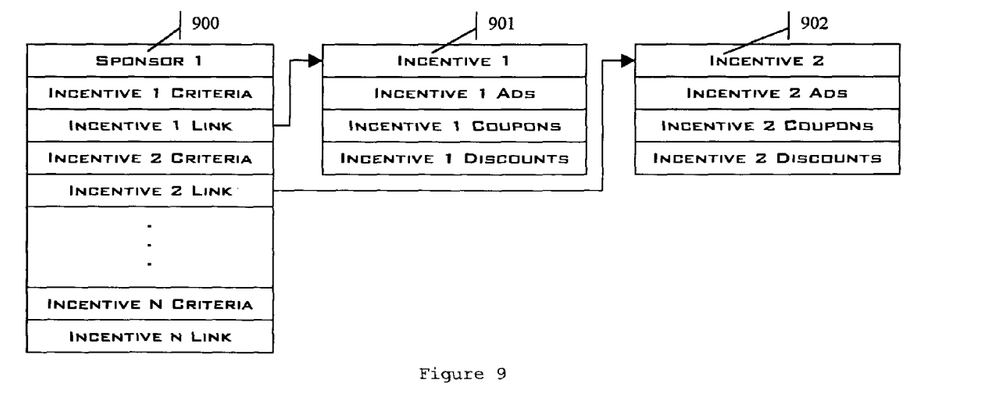
FIG. 9 shows data that is contained in blocks in the database on the database server 103.

FIG. 9 shows an embodiment of the data that is contained in blocks in the database on the database server 103. For each sponsor, there is a block of records 900 that contains multiple records. One record contains the sponsor name. For each incentive, there are two records. One of these records contains the criteria for the viewer to receive the incentive such as a specific amount of time watching a particular broadcast. The other record contains a link to the particular incentive. Each incentive has a block of records such as 901 and 902. The block includes a record of the incentive name, and a number of other records that contain information about advertisements, coupons, discounts, etc. that should be offered to the viewer who has met the incentive criteria.

I claim:

1. A method for allowing content to be broadcast without commercial interruption, yet letting a sponsor of the broadcast offer incentives to viewers to watch the broadcast, the method comprising:

receiving a broadcast with embedded information about the broadcast, said embedded information being provided to allow construction of a viewing record of the broadcast, the embedded information including information indicative of one or more sponsors of the broadcast;

extracting and displaying content from said broadcast without commercial interruption to a viewer;

extracting said embedded information from said broadcast;

storing said embedded information;

collecting viewer information including a user identifier and information indicative of an amount of the broadcast viewed by the viewer, specific incentives and links to the specific incentives being associated with the amount of the broadcast viewed by the viewer, wherein the collected viewer information is not collected in response to prompted viewer feedback provided by the viewer as part of viewer participation in an interactive reward program;

sending said stored embedded information and viewer information to a remote computer to allow said remote computer to construct said viewing record; and providing the specific incentives to the viewer based on said viewing record, the viewing record including viewer information obtained without prompted viewer feedback provided by the viewer as part of viewer participation in an interactive reward program, the specific incentives including information indicative of one or more sponsors of the broadcast.

2. A method for allowing content to be broadcast without commercial interruption, yet letting a sponsor of the broadcast offer incentives to viewers to watch the broadcast, the method comprising:

receiving a broadcast with information about the broadcast embedded into the broadcast at regular time periods, said information including timestamps each identifying a time slice during which the broadcast is received, the embedded information including information indicative of one or more sponsors of the broadcast;

extracting and displaying content from said broadcast without commercial interruption to a viewer;

extracting said embedded information from said broadcast;

incrementing counters for counting time slices during which said broadcast is received;

storing said embedded information and said counter values;

collecting viewer information including a user identifier and information indicative of an amount of the broadcast viewed by the viewer, specific incentives and links to the specific incentives being associated with the amount of the broadcast viewed by the viewer, wherein the collected viewer information is not collected in response to prompted viewer feedback provided by the viewer as part of viewer participation in an interactive reward program;

sending said embedded information, said counter values and viewer information to a remote computer to allow a viewing time to be determined; and providing the specific incentives to the viewer based on said embedded information and the viewer information obtained without prompted viewer feedback provided by the viewer as part of viewer participation in an interactive reward program, the specific incentives including information indicative of one or more sponsors of the broadcast.

3. A method for allowing content to be broadcast without commercial interruption, yet letting a sponsor of the broadcast offer incentives to viewers to watch the broadcast, the method comprising:

embedding information along with the broadcast content, said embedded information including information that allows viewer information to be determined, the viewer information including information indicative of an amount of the broadcast viewed by a remote viewer, specific incentives and links to the specific incentives being associated with the amount of the broadcast viewed by the remote viewer, the embedded information including information indicative of one or more sponsors of the broadcast; and broadcasting said content with said embedded information to the remote viewer of the content without commercial interruption, the embedded information enabling a remote computer to retain the information indicative of one or more sponsors of the broadcast, and to determine the viewer information, the viewer information further including a user identifier and the information indicative of an amount of the broadcast viewed by the remote viewer, specific incentives being based in part on the amount of the broadcast viewed by the remote viewer, wherein the viewer information is not determined in response to prompted viewer feedback provided by the remote viewer as part of remote viewer participation in an interactive reward program.

4. The method of claim 3 further comprising:

obtaining the stored embedded information so as to determine said viewer information; and sending the links to the specific incentives to said remote viewer based on said viewer information, the viewer information being determined without prompted viewer feedback provided by the remote viewer as part of remote viewer participation in an interactive reward program.

5. A method for allowing content to be broadcast without commercial interruption, yet letting a sponsor of the broadcast offer incentives to viewers to watch the broadcast, the method comprising:

embedding information along with the broadcast content at regular time periods, wherein said embedded information, when collected over time, allows a viewing record of the broadcast to be determined, the embedded information including information indicative of one or more sponsors of the broadcast; and broadcasting said content with said embedded information without commercial interruption to a remote viewer of the content, the embedded information enabling a remote computer to retain the viewing record, information indicative of one or more sponsors of the broadcast, and viewer information, the viewer information including a user identifier and information indicative of an amount of the broadcast viewed by the remote viewer, specific incentives and links to the specific incentives being associated with the amount of the broadcast viewed by the remote viewer, wherein the viewer information is not collected in response to prompted viewer feedback provided by the remote viewer as part of remote viewer participation in an interactive reward program.

6. The method of claim 5 further comprising:

providing collected embedded information about said broadcast at a predetermined time;

from said collected embedded information, determining a number of time slices during which the broadcast is received by the remote viewer; and sending links to the specific incentives to said remote viewer based on said time slices, the time slices being obtained without prompted viewer feedback provided by the remote viewer as part of remote viewer participation in an interactive reward program.

7. A method for allowing content to be broadcast without commercial interruption, yet letting a sponsor of the broadcast offer incentives to viewers to watch the broadcast, the method comprising:
receiving information representing a viewing record including information related to a viewer's viewing of a broadcast without commercial interruption, the viewing record including information indicative of one or more sponsors of the broadcast and viewer information including a user identifier and information indicative of an amount of the broadcast viewed by the viewer, specific incentives and links to the specific incentives being associated with the amount of the broadcast viewed by the viewer, wherein the viewer information is not collected in response to prompted viewer feedback provided by the remote viewer as part of viewer participation in an interactive reward program; and
sending the links to the specific incentives to the viewer based on said viewing record including information indicative of one or more sponsors of the broadcast, the viewing record including viewer information obtained without prompted viewer feedback provided by the viewer as part of viewer participation in an interactive reward program.

8. A method for allowing content to be broadcast without commercial interruption, yet letting a sponsor of the broadcast offer incentives to viewers to watch the broadcast, the method comprising:
receiving information about a remote viewer's viewing of a broadcast without commercial interruption, the received information including information indicative of one or more sponsors of the broadcast;
receiving counter values representing the number of time slices viewed by the remote viewer;
collecting viewer information including a user identifier and information indicative of an amount of the broadcast viewed by the viewer, specific incentives and links to the specific incentives being associated with the amount of the broadcast viewed by the viewer, wherein the collected viewer information is not collected in response to prompted viewer feedback provided by the remote viewer as part of remote viewer participation in an interactive reward program; and
sending specific incentives to the remote viewer based on said information received, including information indicative of one or more sponsors of the broadcast, and said counter values received, said information received being obtained without prompted viewer feedback provided by the remote viewer as part of remote viewer participation in an interactive reward program.

9. A method for allowing content to be broadcast without commercial interruption, yet letting a sponsor of the broadcast offer incentives to viewers to watch the broadcast, the method comprising:
receiving information representing a viewing record including information related to a remote viewer's viewing of a broadcast without commercial interruption, the viewing record including information indicative of one or more sponsors of the broadcast, the viewing record further including information indicative of a user identifier and information indicative of an amount of the broadcast viewed by the remote viewer, specific incentives and links to the specific incentives being associated with the amount of the broadcast viewed by the remote viewer, wherein the information representing a viewing record is not collected in response to prompted viewer feedback provided by the remote viewer as part of remote viewer participation in an interactive reward program;
searching a database for information about sponsors of the content of said broadcast and the specific incentives offered by said sponsors;
creating a Web page containing links to sponsor incentive websites and to specific incentives based on said database information and said viewing record; and
sending said Web page to said remote viewer.

10. A method for allowing content to be broadcast without commercial interruption, yet letting a sponsor of the broadcast offer incentives to viewers to watch the broadcast, the method comprising:
receiving information representing a viewing record including information related to a remote viewer's viewing of a broadcast without commercial interruption, the viewing record including information indicative of one or more sponsors of the broadcast and viewer information including information indicative of an amount of the broadcast viewed by the remote viewer, specific incentives and links to the specific incentives being associated with the amount of the broadcast viewed by the remote viewer, wherein the viewer information is not collected in response to prompted viewer feedback provided by the remote viewer as part of remote viewer participation in an interactive reward program;
receiving counter values representing the number of time slices during which the broadcast was viewed by said remote viewer;
searching a database for information about sponsors of the content and the specific incentives offered by said sponsors;
creating a Web page containing links to sponsor incentive websites and to specific incentives based on said database information, said viewing record, and said counter values; and
sending said Web page to said remote viewer.

* * * * *